E. M. TORMIN.
DYNAMO ELECTRIC MACHINE.
APPLICATION FILED JUNE 17, 1910.

1,010,533.

Patented Dec. 5, 1911.

UNITED STATES PATENT OFFICE.

EGMONT MAX TORMIN, OF BROOKLINE, MASSACHUSETTS, ASSIGNOR TO HOLTZER-CABOT ELECTRIC COMPANY, A CORPORATION OF MASSACHUSETTS.

DYNAMO-ELECTRIC MACHINE.

1,010,533.  Specification of Letters Patent.  Patented Dec. 5, 1911.

Application filed June 17, 1910. Serial No. 567,433.

*To all whom it may concern:*

Be it known that I, EGMONT MAX TORMIN, a citizen of the United States, residing in Brookline, in the county of Norfolk and State of Massachusetts, have invented an Improvement in Dynamo-Electric Machines, of which the following description, in connection with the accompanying drawings, is a specification, like letters on the drawings representing like parts.

The present invention relates to a dynamo-electric machine, and is embodied in a generator of alternating currents for signaling purposes in which regular alternating currents differing in frequency are used to operate signaling bells on a single line, such, for example, as a telephone party line.

It is the purpose of the invention to combine in a single machine, a number of windings adapted to be excited by a common rotating field member, so that alternating currents will be delivered from the machine having, respectively, 1, 2, 3 and 4 cycles per revolution. It has been the custom, heretofore, to utilize separate generators for the different currents, which not only largely increases the cost of installation, but also requires the use of much additional power.

In accordance with the present invention, the windings for the different kinds of current delivered are all mounted on a common core, and excited by a single rotating field member common to all, the said field member consisting of a bi-polar bar magnet having two windings so that the opposite ends thereof are oppositely polarized. The stationary member is of the usual laminated type consisting of annular laminæ having internally projecting teeth to receive the windings, the said armature surrounding the rotary field member.

The invention resides mainly in novel features of construction and arrangement whereby the various currents having the characteristics above described can be delivered from the machine.

Figure 1:
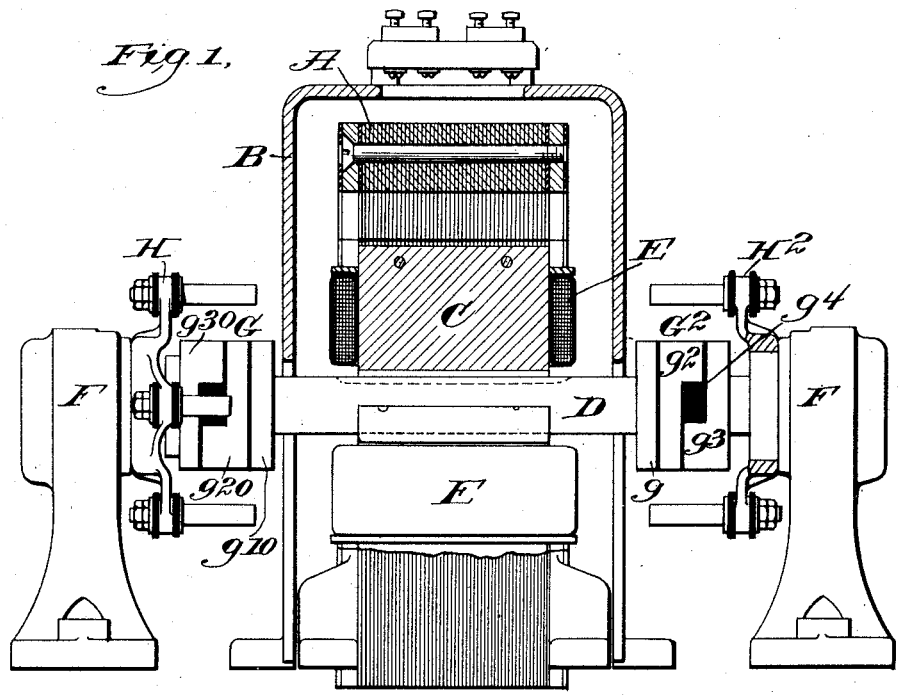
Figure 2:
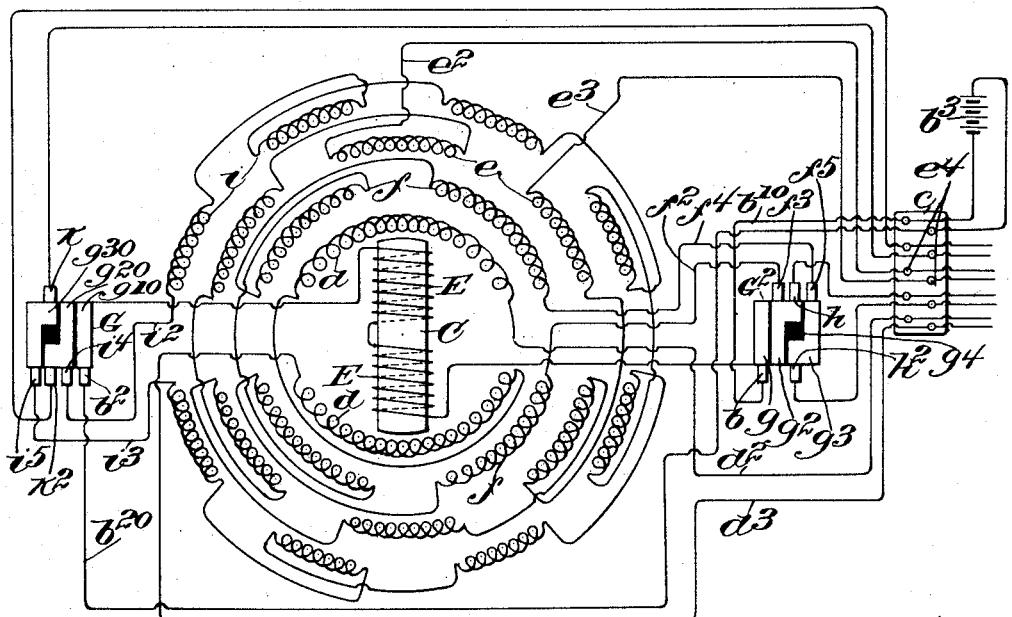

Figure 1 is a side elevation, partly in section, of a machine embodying the invention; and Fig. 2 is a general diagram of the circuits and their connections.

Referring to Fig. 1, the general construction of the machine is substantially the same as that of any electric generator, the machine being shown as provided with a stationary laminated armature A inclosed in a casing B, and surrounding a rotating field member C which is shown as a bi-polar member mounted on a rotatable shaft D and having two exciting coils E. The shaft D is shown as mounted in standards F at opposite ends, and carries the commutators G and $G^2$, the brush holders H, $H^2$, being also mounted on the standards.

The above illustration and description are mainly for the purpose of giving a general idea of the compactness of the machine, the features of novelty residing mainly in the arrangement of the windings, and in the circuit connections which are clearly shown in the diagram, Fig. 2.

Each of the commutators G and $G^2$ is provided with three insulated collecting portions indicated by the reference letters $g$, $g^2$ and $g^3$ at one end, and $g^{10}$, $g^{20}$, $g^{30}$ at the opposite end. The coils on the field member C are wound in series and connected respectively with the collector rings $g$ and $g^{10}$ which in turn are connected by brushes $b$ and $b^2$ and conductors $b^{10}$ and $b^{20}$ with a battery or other source of direct current $b^3$. The stationary member which surrounds the rotating field magnet is provided, in accordance with the invention, with a plurality of windings each adapted to produce alternating currents of different frequency. The circuits leading from the several windings are shown as leading to a terminal board $c$, which is conventionally shown; and the electro-motive forces induced in the several windings can be selectively connected through the terminal board, to any line leading to the point which is to be signaled, that is to say, such, for example, as any telephone party line, by utilizing switches commonly in use in telephone central offices.

The bi-polar winding $d$ consists of two coils, this winding generating an induced electro-motive force having one alternation per revolution, and the ends of this winding are connected directly through the conductors $d^2$ and $d^3$ with the terminal board. The winding $e$ for the six-pole generator also has the polar extremities of adjacent coils of the same polarity, so that an induced electro-motive force having three alternations will be produced at each revolution, and the terminals of this winding $e$ are connected directly through conductors $e^2$ and $e^3$ with the board at $e^4$. In winding the coils for the four and eight pole generators, however, while it is possible to carry out the winding so that the adjacent ends of the several coils will be of like polarity, the induced electro-motive forces will be neutralized if such a winding is employed, because the north and south poles of each coil will be opposite similar poles, so that as the polar extremities of the field member pass, an electro-motive force in one direction will be induced in one coil, while an electro-motive force in the other direction will be induced in the coil influenced by the other pole of the field. In order, therefore, to create an induced electro-motive force of the character required for the signal, I divide the windings into two sets in order to bring unlike poles opposite to each other, throughout. This results, however, in inducing two adjacent half waves in the same direction in each half revolution, and to correct this I employ a commutator which is arranged to shift the terminal connections at each half-revolution. The commutator $G^2$ is the one employed in connection with the winding $f$, one terminal of the said winding being connected by a conductor $f^2$ with a brush $f^3$ which bears on the collector ring $g^2$, and the other terminal being connected through a conductor $f^4$ with a brush $f^5$ which bears on the other collector ring $g^3$. The collector rings $g^3$ have projecting portions each extending into the path of the other, and extending approximately half way around the commutator, the said portions being separated at opposite sides of the commutator by blocks of insulating material. These projecting portions are engaged by brushes $h$ and $h^2$ which in turn are connected through conductors with the terminal board. The brushes are located between the collector rings so as alternately to engage the projecting portions and pass from one of said portions to the other at each half revolution of the shaft, thereby reversing the line terminals. The eight-pole winding is similarly connected with the line through the commutator at the opposite end of the shaft, the terminals of the eight-pole winding $i$ being connected through conductors $i^2$ and $i^3$ with the brushes $i^4$ and $i^5$. The conductors which lead to the terminal board are arranged as previously described in connection with the other commutator and receive the induced electro-motive force through the brushes $k$ and $k^2$.

By this construction, the generator, through the operation of the rotating field, will send out four alternating currents having, respectively, 1, 2, 3 and 4 cycles per revolution, thus providing for four selective signals on a telephone party line, for example, all of which can be used at the same time over different lines, if necessary.

It is necessary in utilizing the single rotary field member C, above described, that the polar extremities thereof should be narrower than the lengths of the shortest windings, in order to produce the regular rise and fall of the induced electro-motive force as the field member passes into and out of the fields of the adjacent windings. The armature must, therefore, be designed with a view to producing the regular alternating current in connection with the eight-pole winding, that is, the winding having the most coils, in a machine in which induced electro-motive forces having 1, 2, 3 and 4 alternations per revolution are to be produced. The two-pole windings $d$, the four-pole windings $f$ and the six-pole windings $e$ must be longer than the eight pole windings, as shown in the diagram, Fig. 2, in order to produce a continuous alternating current, and with the rotary field member designed as above described the induced electro-motive force in the currents of lesser alternations will remain at its maximum effect during a considerable period of a revolution if the ordinary winding is used. Current waves of this form are not suitable for signaling purposes, and, in order to cause the forces to approach more nearly what is known as sine waves, I increase the number of coils of the longer winding from the ends to the middle, so as to cause the necessary continuous rise and fall of the induced electro-motive force. This feature is illustrated in the diagram, Fig. 2, which shows the windings as having a greater number of turns in the middle than at the ends.

What I claim is:

1. In an alternating current dynamo electric machine, a bi-polar field member; an armature; and a plurality of sets of windings on said armature, each set having a different number of windings to induce alternating electric motive forces differing in frequency.

2. In a dynamo-electric machine, a bi-polar field member; an armature; and a plurality of sets of windings on said armature, each set having a different number of windings to induce electro-motive forces differing in frequency, the number of turns in the windings themselves for the currents of lower frequency being gradually increased from the ends toward the middle of each thereof.

3. In a dynamo-electric machine, a bi-polar field member; an armature; an eight-pole winding on said armature, the direction of the turns in said winding being reversed around half the armature; and a commutator to reverse the direction of the current during half a revolution, whereby a regular alternating current having four cycles to a revolution can be delivered from the machine.

4. In a dynamo-electric machine, a bipolar field member; an armature; an eight-pole winding on said armature, the direction of the turns in said winding being reversed around half the armature; a commutator to reverse the direction of the current during half a revolution, whereby a regular alternating current having four cycles to a revolution can be delivered from the machine; a four-pole winding on the same armature having its coils similarly wound, and a separate commutator for said four-pole winding.

5. In a dynamo-electric machine, a bipolar field member; an armature; an eight-pole winding on said armature, the direction of the turns in said windings being reversed around half the armature; a commutator to reverse the direction of the current during half a revolution, whereby a regular alternating current having four cycles to a revolution can be delivered from the machine; a four-pole winding on the same armature having its coils similarly wound; a separate commutator for said four-pole winding; and a two-pole winding and a six-pole winding also on the same armature, said two and six pole windings delivering current directly to the line.

6. In a dynamo-electric machine, a bipolar field member; an armature; an eight-pole winding on said armature, the direction of the turns in said winding being reversed around half the armature; a commutator to reverse the direction of the current during half a revolution, whereby a regular alternating current having four cycles to a revolution can be delivered from the machine; a four-pole winding on the same armature having its coils similarly wound; a separate commutator for said four-pole winding; and a two-pole winding and a six-pole winding also on the same armature, said two and six pole windings delivering current directly to the line, the coils of the two, four and six pole windings being of higher resistance at the middle than at the ends.

In testimony whereof, I have signed my name to this specification in the presence of two subscribing witnesses.

EGMONT MAX TORMIN.

Witnesses:
ARTHUR E. HUNTER,
JAS. J. MALONEY.